US012399571B2

(12) United States Patent
Medarametla Lakshmi

(10) Patent No.: US 12,399,571 B2
(45) Date of Patent: Aug. 26, 2025

(54) HAND-MOVEMENT BASED INTERACTION WITH AUGMENTED REALITY OBJECTS

(71) Applicant: T-Mobile USA, Inc., Bellevue, WA (US)

(72) Inventor: Bharath Reddy Medarametla Lakshmi, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/067,956

(22) Filed: Dec. 19, 2022

(65) Prior Publication Data

US 2024/0201787 A1 Jun. 20, 2024

(51) Int. Cl.
| | |
|---|---|
| *G06F 3/01* | (2006.01) |
| *G06F 3/0484* | (2022.01) |
| *G06T 19/00* | (2011.01) |
| *G06V 20/20* | (2022.01) |
| *G06V 40/10* | (2022.01) |
| *G06V 40/20* | (2022.01) |
| *H04M 1/72454* | (2021.01) |

(52) U.S. Cl.
CPC .............. *G06F 3/017* (2013.01); *G06F 3/011* (2013.01); *G06F 3/0484* (2013.01); *G06T 19/006* (2013.01); *G06V 20/20* (2022.01); *G06V 40/10* (2022.01); *G06V 40/28* (2022.01); *H04M 1/72454* (2021.01)

(58) Field of Classification Search
CPC ........ G06F 3/017; G06F 3/011; G06F 3/0484; G06T 19/006; G06V 20/20; G06V 40/10; G06V 40/28; H04M 1/72454
See application file for complete search history.

(56) References Cited

U.S. PATENT DOCUMENTS

| | | | | | |
|---|---|---|---|---|---|
| 5,742,263 | A | * | 4/1998 | Wang | .................... G06F 3/0321 345/9 |
| 5,917,460 | A | * | 6/1999 | Kodama | ............ G02B 27/0093 345/7 |
| 6,198,484 | B1 | * | 3/2001 | Kameyama | ............. G06T 15/10 348/42 |

(Continued)

FOREIGN PATENT DOCUMENTS

| | | |
|---|---|---|
| CN | 107305435 A | 10/2017 |
| CN | 109564706 A | 4/2019 |

(Continued)

*Primary Examiner* — Justin R. Blaufeld
(74) *Attorney, Agent, or Firm* — Perkins Coie LLP

(57) ABSTRACT

This document discloses techniques, apparatuses, and systems for hand-movement based interactions with augmented reality (AR) objects. A set of hand gestures is determined, where each hand gesture is associated with a respective interaction with a virtual object in an AR environment. An environment is captured within the field of view of a viewfinder and included within an AR environment having a virtual object. A hand gesture is performed in the field of view of the viewfinder is captured. The captured hand gesture is determined to correspond to a particular hand gesture from the set of hand gestures. As a result, a particular interaction associated with the particular hand gesture is performed on an object within the augmented reality environment. In doing so, an AR engine can effectively interact with objects in an AR environment using hand gestures.

20 Claims, 4 Drawing Sheets

(56) References Cited

U.S. PATENT DOCUMENTS

| | | | | |
|---|---|---|---|---|
| 6,388,639 | B1* | 5/2002 | Hoshino | H04N 13/368 |
| | | | | 348/E13.058 |
| 7,825,996 | B2* | 11/2010 | Yamada | G02B 27/017 |
| | | | | 348/744 |
| 8,179,449 | B2* | 5/2012 | Larsson | G06F 3/0346 |
| | | | | 348/222.1 |
| 8,290,244 | B2* | 10/2012 | Ha | H04N 13/144 |
| | | | | 348/47 |
| 8,487,838 | B2* | 7/2013 | Lewis | G02B 27/017 |
| | | | | 359/630 |
| 8,799,810 | B1* | 8/2014 | Wheeler | G06F 3/012 |
| | | | | 348/208.99 |
| 8,953,889 | B1* | 2/2015 | Worley, III | G06F 16/24556 |
| | | | | 455/457 |
| 9,623,334 | B2 | 4/2017 | Anderson et al. | |
| 9,639,964 | B2 | 5/2017 | Fein et al. | |
| 9,646,400 | B2 | 5/2017 | Weerasinghe | |
| 9,665,983 | B2 | 5/2017 | Spivack | |
| 9,685,005 | B2 | 6/2017 | Kjallstrom et al. | |
| 9,721,386 | B1* | 8/2017 | Worley, III | G06F 9/5066 |
| 9,766,703 | B2 | 9/2017 | Miller | |
| 9,767,616 | B2 | 9/2017 | Miller | |
| 9,805,511 | B2 | 10/2017 | Hintermeister et al. | |
| 9,824,501 | B2 | 11/2017 | Soon-shiong | |
| 9,852,548 | B2 | 12/2017 | Greco et al. | |
| 9,891,704 | B2 | 2/2018 | Hilliges et al. | |
| 9,911,235 | B2 | 3/2018 | Seichter et al. | |
| 9,916,002 | B2 | 3/2018 | Petrovskaya et al. | |
| 9,921,641 | B1 | 3/2018 | Worley et al. | |
| 9,922,462 | B2 | 3/2018 | Miller | |
| 9,947,139 | B2 | 4/2018 | Yasutake | |
| 9,972,132 | B2 | 5/2018 | O'connor et al. | |
| 10,261,595 | B1* | 4/2019 | Kin | G06F 3/04815 |
| 11,023,035 | B1* | 6/2021 | Atlas | G06F 3/014 |
| 11,182,465 | B2 | 11/2021 | Zhu | |
| 11,270,510 | B2 | 3/2022 | Warhol | |
| 2002/0010734 | A1 | 1/2002 | Ebersole et al. | |
| 2002/0122585 | A1* | 9/2002 | Swift | H04N 7/17318 |
| | | | | 348/E7.071 |
| 2002/0167462 | A1* | 11/2002 | Lewis | G02B 27/0093 |
| | | | | 345/7 |
| 2003/0234797 | A1* | 12/2003 | Williams | G06F 1/1684 |
| | | | | 345/649 |
| 2005/0275636 | A1* | 12/2005 | Dehlin | G06F 3/014 |
| | | | | 345/173 |
| 2007/0047040 | A1* | 3/2007 | Ha | H04N 13/144 |
| | | | | 348/E13.067 |
| 2009/0189974 | A1* | 7/2009 | Deering | G02B 27/0093 |
| | | | | 348/51 |
| 2009/0254843 | A1* | 10/2009 | Van Wie | H04L 67/131 |
| | | | | 707/999.005 |
| 2009/0313584 | A1* | 12/2009 | Kerr | G06F 3/04815 |
| | | | | 715/849 |
| 2010/0226535 | A1* | 9/2010 | Kimchi | G06F 3/013 |
| | | | | 382/103 |
| 2010/0241998 | A1* | 9/2010 | Latta | G06F 3/011 |
| | | | | 715/862 |
| 2011/0032252 | A1* | 2/2011 | Ohta | H04N 13/10 |
| | | | | 345/419 |
| 2011/0115887 | A1* | 5/2011 | Yoo | H04N 13/398 |
| | | | | 348/51 |
| 2011/0193939 | A1* | 8/2011 | Vassigh | G06F 3/011 |
| | | | | 348/169 |
| 2011/0205341 | A1* | 8/2011 | Wilson | G06F 3/011 |
| | | | | 348/51 |
| 2011/0242134 | A1* | 10/2011 | Miller | G06F 3/017 |
| | | | | 345/633 |
| 2011/0267456 | A1* | 11/2011 | Adermann | H04N 7/181 |
| | | | | 348/135 |
| 2011/0289456 | A1* | 11/2011 | Reville | G06F 3/017 |
| | | | | 715/830 |
| 2011/0316845 | A1 | 12/2011 | Roberts et al. | |
| 2012/0013613 | A1* | 1/2012 | Vesely | H04N 13/30 |
| | | | | 345/419 |
| 2012/0086727 | A1* | 4/2012 | Korah | G06F 3/03 |
| | | | | 345/633 |
| 2012/0113223 | A1 | 5/2012 | Hilliges et al. | |
| 2012/0194418 | A1* | 8/2012 | Osterhout | G02B 27/0149 |
| | | | | 345/156 |
| 2012/0194548 | A1* | 8/2012 | Ahn | H04W 4/203 |
| | | | | 345/633 |
| 2012/0249741 | A1* | 10/2012 | Maciocci | G06T 19/006 |
| | | | | 348/51 |
| 2012/0256954 | A1* | 10/2012 | Soon-Shiong | A63F 13/335 |
| | | | | 345/633 |
| 2012/0268493 | A1* | 10/2012 | Hayakawa | A63F 13/213 |
| | | | | 345/633 |
| 2012/0287040 | A1* | 11/2012 | Moore | G02B 27/01 |
| | | | | 345/157 |
| 2012/0326966 | A1* | 12/2012 | Rauber | G06F 3/0304 |
| | | | | 345/156 |
| 2013/0007672 | A1* | 1/2013 | Taubman | G06F 3/0482 |
| | | | | 715/863 |
| 2013/0027517 | A1* | 1/2013 | Kim | H04N 13/366 |
| | | | | 348/46 |
| 2013/0104087 | A1* | 4/2013 | Mlyniec | G06F 3/04815 |
| | | | | 715/849 |
| 2013/0106674 | A1* | 5/2013 | Wheeler | G06F 3/013 |
| | | | | 345/8 |
| 2013/0117707 | A1* | 5/2013 | Wheeler | G06F 3/012 |
| | | | | 715/784 |
| 2013/0139082 | A1* | 5/2013 | Wheeler | G02B 27/017 |
| | | | | 715/765 |
| 2013/0178257 | A1* | 7/2013 | Langseth | A63F 13/23 |
| | | | | 345/419 |
| 2013/0182082 | A1* | 7/2013 | Hayashi | H04N 23/6812 |
| | | | | 348/49 |
| 2013/0188021 | A1* | 7/2013 | Sim | H04N 21/816 |
| | | | | 348/46 |
| 2013/0229524 | A1* | 9/2013 | Vovkushevsky | B60R 1/27 |
| | | | | 348/148 |
| 2013/0237811 | A1* | 9/2013 | Mihailescu | G01S 17/66 |
| | | | | 600/407 |
| 2013/0241805 | A1* | 9/2013 | Gomez | G06F 3/013 |
| | | | | 345/8 |
| 2013/0246967 | A1* | 9/2013 | Wheeler | G06F 3/012 |
| | | | | 715/784 |
| 2013/0265218 | A1* | 10/2013 | Moscarillo | G06F 21/83 |
| | | | | 345/156 |
| 2013/0290911 | A1* | 10/2013 | Praphul | G06F 3/038 |
| | | | | 715/863 |
| 2013/0311997 | A1* | 11/2013 | Gruber | G06F 9/4843 |
| | | | | 718/102 |
| 2013/0316695 | A1* | 11/2013 | Park | H04L 51/18 |
| | | | | 455/419 |
| 2013/0326364 | A1* | 12/2013 | Latta | G06F 3/012 |
| | | | | 715/751 |
| 2013/0343601 | A1* | 12/2013 | Jia | G06V 40/28 |
| | | | | 382/103 |
| 2014/0019910 | A1* | 1/2014 | Kim | G06F 3/0486 |
| | | | | 715/810 |
| 2014/0091912 | A1* | 4/2014 | Lazarro | G08C 17/02 |
| | | | | 340/12.52 |
| 2014/0270477 | A1* | 9/2014 | Coon | G01C 11/04 |
| | | | | 382/154 |
| 2014/0282282 | A1* | 9/2014 | Holz | G06F 3/017 |
| | | | | 715/863 |
| 2014/0327628 | A1* | 11/2014 | Tijssen | G06F 3/0488 |
| | | | | 345/173 |
| 2014/0333667 | A1* | 11/2014 | Jung | G06T 11/00 |
| | | | | 345/633 |
| 2015/0040074 | A1* | 2/2015 | Hofmann | G06T 19/006 |
| | | | | 715/852 |
| 2015/0112962 | A1* | 4/2015 | Simhon | G06F 16/951 |
| | | | | 707/709 |
| 2015/0146007 | A1* | 5/2015 | Dusik | G06T 19/006 |
| | | | | 348/161 |

(56) References Cited

U.S. PATENT DOCUMENTS

| | | | |
|---|---|---|---|
| 2016/0026253 A1* | 1/2016 | Bradski | H04N 13/128 |
| | | | 345/8 |
| 2016/0133230 A1* | 5/2016 | Daniels | G06F 3/147 |
| | | | 345/633 |
| 2016/0163063 A1* | 6/2016 | Ashman | G06T 19/006 |
| | | | 345/633 |
| 2017/0103440 A1 | 4/2017 | Xing et al. | |
| 2017/0132841 A1* | 5/2017 | Morrison | G06V 20/20 |
| 2017/0177080 A1* | 6/2017 | Deleeuw | G06T 13/80 |
| 2017/0193693 A1* | 7/2017 | Robert | G01B 11/24 |
| 2017/0309077 A1 | 10/2017 | Lam | |
| 2017/0364234 A1* | 12/2017 | Ligameri | G06F 3/0488 |
| 2018/0095635 A1* | 4/2018 | Valdivia | G02B 27/0093 |
| 2018/0113598 A1* | 4/2018 | Linder | G06F 3/017 |
| 2018/0315406 A1* | 11/2018 | Kar | G10H 1/0008 |
| 2019/0107990 A1* | 4/2019 | Spivack | G06T 11/60 |
| 2019/0192972 A1* | 6/2019 | Garbut | A63F 13/52 |
| 2019/0212827 A1* | 7/2019 | Kin | G02B 27/0172 |
| 2019/0258456 A1* | 8/2019 | Byun | H04L 51/02 |
| 2019/0260870 A1* | 8/2019 | Spivack | G06F 3/011 |
| 2019/0265801 A1* | 8/2019 | Yildiz | G06F 3/017 |
| 2019/0340816 A1* | 11/2019 | Rogers | G06F 21/629 |
| 2019/0391716 A1* | 12/2019 | Badr | G08C 17/02 |
| 2020/0004401 A1* | 1/2020 | Hwang | G06F 3/04815 |
| 2020/0309557 A1* | 10/2020 | Efland | G06V 20/20 |
| 2021/0011556 A1* | 1/2021 | Atlas | G06T 19/006 |
| 2021/0074068 A1* | 3/2021 | Spivack | G06N 20/00 |
| 2021/0097776 A1* | 4/2021 | Faulkner | G06F 3/017 |
| 2021/0304506 A1* | 9/2021 | Mourkogiannis | G06T 17/20 |
| 2022/0076492 A1* | 3/2022 | Smith | G06T 19/006 |

FOREIGN PATENT DOCUMENTS

| | | |
|---|---|---|
| CN | 107168537 B | 7/2020 |
| CN | 111679740 A | 9/2020 |
| EP | 3323110 A1 | 5/2018 |
| EP | 3520354 A1 | 8/2019 |
| EP | 3757726 A1 | 12/2020 |
| EP | 3218781 B1 | 3/2022 |
| JP | 2020173817 A | 10/2020 |
| JP | 2021504771 A | 2/2021 |
| KR | 20140092267 A | 7/2014 |
| KR | 20150057424 A | 5/2015 |
| KR | 101848149 B1 | 5/2018 |
| WO | 2015161307 A1 | 10/2015 |
| WO | 2016109409 A1 | 7/2016 |
| WO | 2018049430 A2 | 3/2018 |
| WO | 2018122709 A1 | 7/2018 |
| WO | 2019023659 A1 | 1/2019 |
| WO | 2019055703 A2 | 3/2019 |
| WO | 2020201998 A1 | 10/2020 |
| WO | 2021102566 A1 | 6/2021 |
| WO | 2021222251 A1 | 11/2021 |

* cited by examiner

HAND-MOVEMENT BASED INTERACTION WITH AUGMENTED REALITY OBJECTS

BACKGROUND

Augmented reality (AR) is an interactive experience that combines the real world and computer-generated content. The content can be of multiple sensory modalities, including, for example, visual, auditory, haptic, and olfactory. AR can be considered as a system that can incorporate three features: a combination of real and virtual worlds, real-time interaction, and accurate 3D registration of virtual and real objects. The overlaid content can be constructive (i.e., additive to the real or background environment) or destructive (i.e., masking of the real or background environment). This experience is seamlessly interwoven with the physical world such that it is perceived as an immersive aspect of the real environment. In this way, AR alters a user's ongoing perception of a real-world environment, whereas virtual reality completely replaces the user's real-world environment with a simulated one.

One value of AR is the manner in which components of the digital world blend into a person's perception of the real world. The blend is not perceived as a simple display of data but, through the integration of immersive sensations, the blend is perceived as natural parts of an environment. AR applications have spanned military (e.g., air force) uses and commercial industries such as education, communications, medicine, gaming, and entertainment.

BRIEF DESCRIPTION OF THE DRAWINGS

Detailed descriptions of implementations of the present invention will be described and explained through the use of the accompanying drawings.

Figure 1:
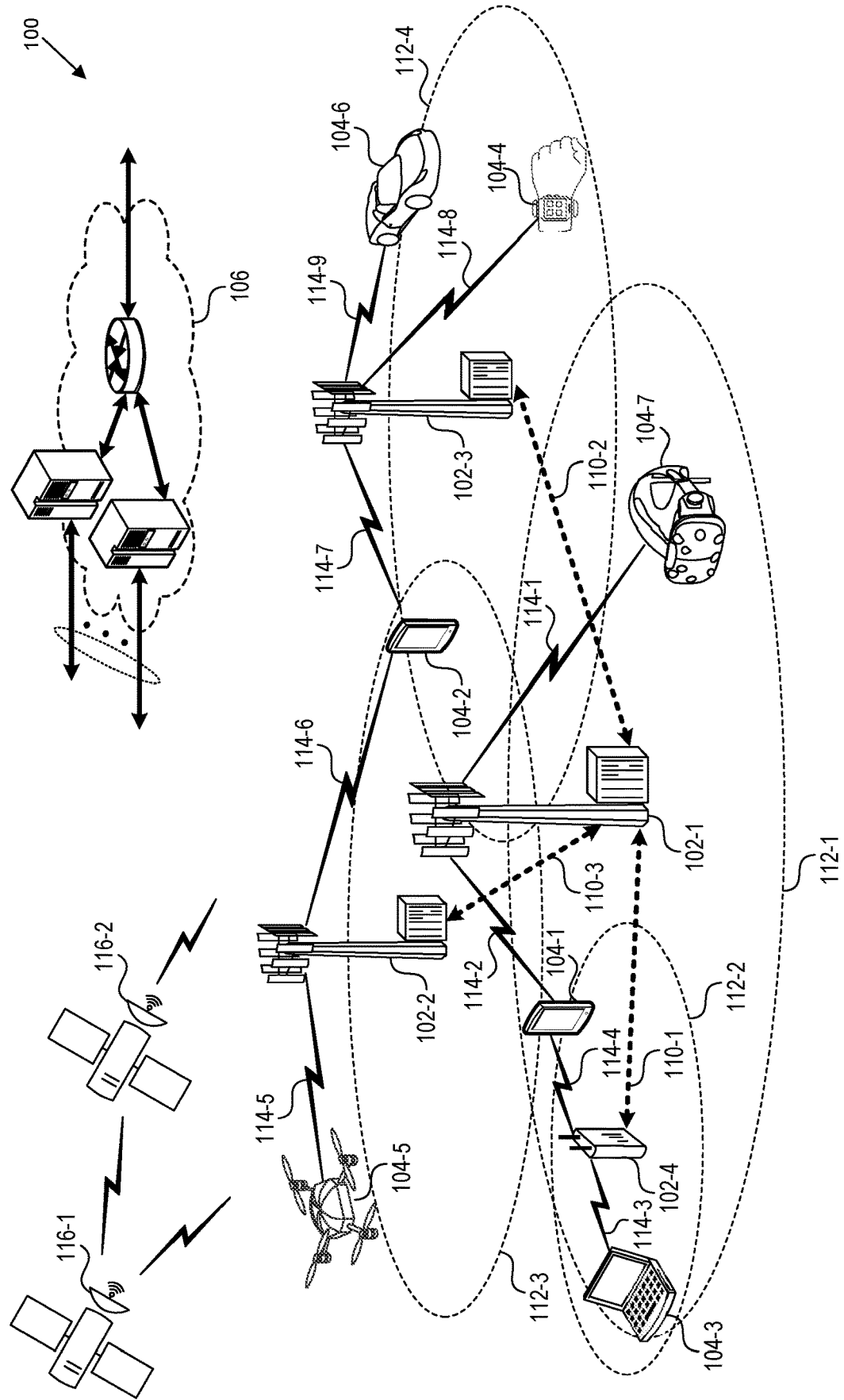
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Augmented reality (AR) is a widely-accepted and developing technology that can help create mixed-reality user-experiences. AR technology can be limited by the ways in which the objects created in AR (e.g., virtual objects created by an AR engine and placed into an AR environment) can be interacted with. Often, such interactions are done by the user directly handling (e.g., manipulating) the objects on the device (e.g., smartphone). These interactions, however, can provide a sub-optimal user experience due to the size of objects on the device. For instance, touch input at a phone screen can be insufficiently granular to enable a user to place, using touch input, an AR mirror at a position on a background wall where the AR mirror becomes centered over a couch in the background environment. The user might have to settle for a placement of the AR mirror that is non-centered, thereby impacting the ability of the user to evaluate the mirror within the space.

Another example can be contemplated in an industrial setting. In this context, the user may want to find a part A that exactly fits into another piece of equipment B. Given the relative size or compatibility requirements of components in the industrial setting, precision in mating components may be particularly important. Accordingly, the user would want to be able to fit AR part A (from a set of similar AR parts) into background equipment piece B with a level of precision such that the user can be confident that the real part A would fit equipment piece B in real-life. As discussed above, this level of precision may be difficult to achieve through on-device interaction (e.g., touch input).

Disclosed herein are techniques, apparatuses, and systems to improve the ability of a user to interact with objects in an AR environment. A device (e.g., smartphone, AR goggles) can provide the AR environment based on a capture of a physical scene using a camera of the device. Instead of requiring on-device interactions, such as touch input, hand gestures performed in a field of view of the camera can be recognized and associated with interactions with an AR object (e.g., an AR-created object or a rendering of a physical object in the captured scene) of the AR environment. For example, a set of recognizable hand gestures can be determined, where each hand gesture is determined to have an associated interaction with an AR object. The hand gesture performed in the field of view of the camera can be identified as a particular hand gesture from the set of recognizable hand gestures, and the interaction associated with the particular hand gesture can be performed on the object in the AR environment. In some implementations, the user can select the object on which to perform the interaction from multiple objects in the AR environment using hand interactions.

An interaction associated with the hand gesture can specify a type, direction, or amount of interaction with the object in the AR environment. For example, an interaction can cause the location/orientation of the object in the AR environment to be changed (e.g., translated, rotated) or the size of the object in the AR environment to be changed. If the interaction is intended to move the object, the interaction can specify a direction (left, right, up, down, forward, back, clockwise, counterclockwise, etc.) of the movement or an amount of the movement. If the interaction is intended to change the size of the object, the interaction can specify whether the size of the object is to increase or decrease or to what amount the size of the object is to change. In some cases, the amount in which the object is to be interacted with can be less than the granularity provided by on-device interaction. As a result, the objects can be controlled to a finer granularity than enabled by on-device interaction.

In aspects, the set of hand gestures and associated interactions can improve user-experience, encourage adaptability, and increase ease-of-use. For instance, the set of hand gestures and associated interactions can be standardized across multiple applications or multiple devices such that similar hand gestures cause similar interactions with AR objects regardless of the application or device providing the AR environment. In doing so, a consistent user-interactive experience can be provided across AR technologies and devices.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown).

The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

The network 100 may support AR services, for example, AR services provided by an application of the wireless devices 104. For instance, an AR environment provided by an application of the wireless devices 104 may be communicated between multiple wireless devices 104 connected to the network 100. In other cases, the network 100 may include one or more services needed to provide the AR environment. For example, an AR engine usable to create the AR environment may be stored on a remote server of the network 100 that is communicatively coupled to the wireless devices 104. A remote server of the network 100 may store information related to recognizable gestures that can be used to interact with the AR environment, such as information characterizing the recognizable gestures and associating them with specific interactions in the AR environment. In yet another example, a remote server of the network 100 can store user data relating to a user preference that defines the AR environment (e.g., color, granularity, application permissions) or the ways in which a user interacts with the AR environment (e.g., the recognizable gestures, interactions associated with the recognizable gestures, recognition threshold).

Hand-Movement Based Interaction for AR Objects

Figure 2:
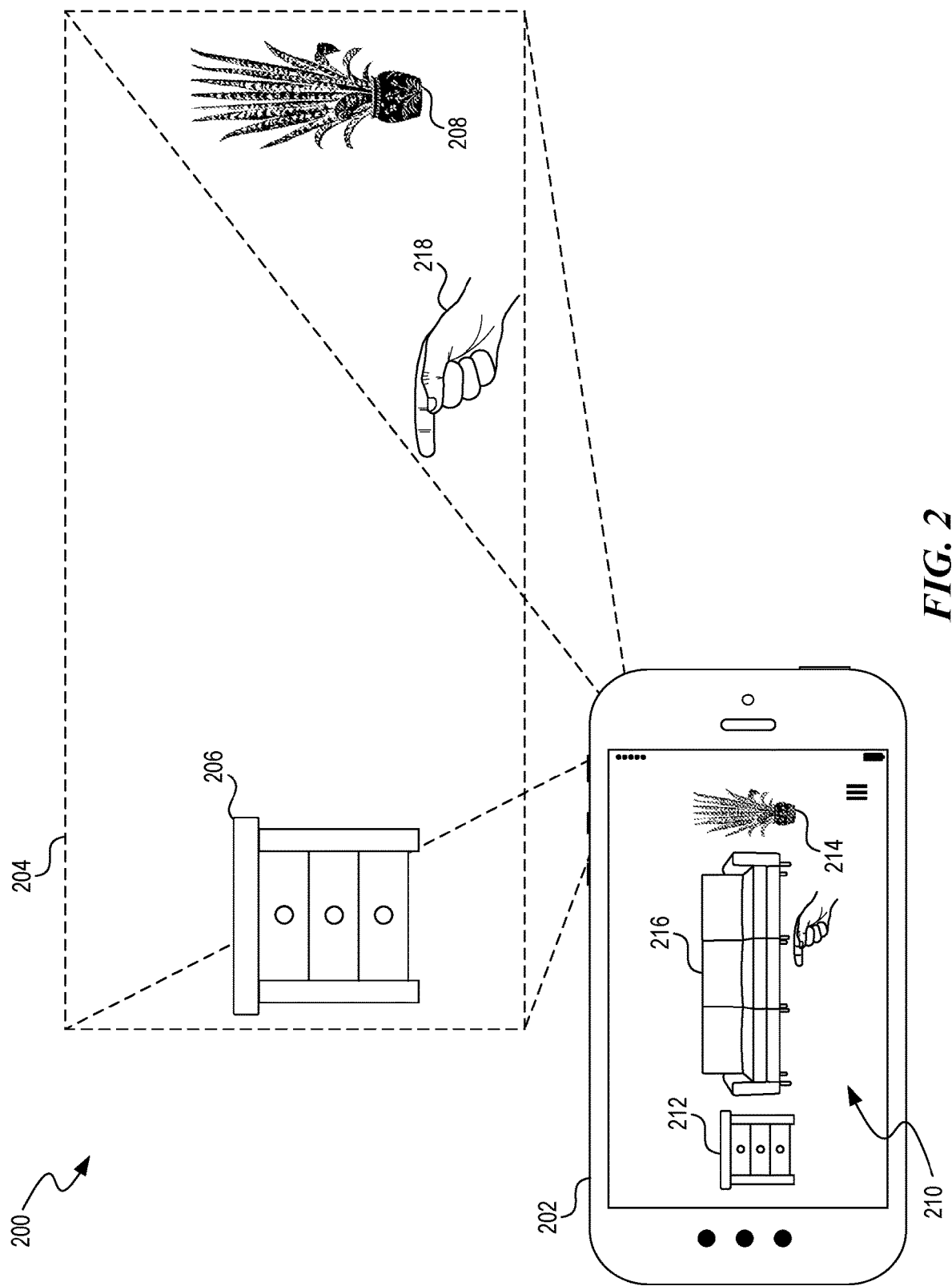
FIG. 2 is a schematic diagram that illustrates a hand-held device that can interact with AR objects in accordance with aspects of the present technology.

FIG. 2 is a schematic diagram 200 that illustrates a hand-held device 202 that can interact with AR objects in accordance with aspects of the present technology. Although illustrated as the hand-held device 202, it should be noted that any other AR-capable device can be used to perform hand-movement based AR object interaction. For example, the techniques disclosed could be performed using a smartphone, a laptop, a game console, AR goggles, or the like. The hand-held mobile device 202 includes a viewfinder (e.g., back camera) (not shown) capable of capturing a physical environment 204 within the field of view of the viewfinder. As illustrated, the physical environment 204 includes a table 206 and a plant 208. The physical environment 204 is used to create the AR environment 210 displayed on the hand-held device 202. The AR environment 210 includes rendered objects (e.g., AR table 212 and AR plant 214) from the physical environment 204 and virtual objects (e.g., AR couch 216) not included in the physical environment 204 and created by an AR engine. A hand 218 is located within the field of view of a viewfinder (e.g., back camera) of the hand-held device 202. The hand 218 performs a specific gesture (e.g., 3D gesture) that is associated with an interaction with an object in the AR environment 210. For example, a user may wish to see how a couch (e.g., from a furniture provider) looks in their living room. To accomplish this, the user can hold the hand-held device 202 and use a capture of the physical environment 204 to create an AR environment 210 in which the AR couch 216 can be visualized in the physical environment 204. To control the arrangement of the AR couch 216 within the AR environment 210, the user can perform a hand gesture to interact with the AR couch 216 (e.g., move the AR couch 216 closer to the AR table 212).

The hand-held device 202 can include a gesture-recognition module to recognize the gesture performed by the hand 218. The gesture-recognition module can analyze data collected about the performance of the hand gesture. For example, the hand-held device 202 can include sensors capable of capturing data about the performance of the hand gesture. In aspects, the sensors can include radar, lidar, or camera sensors. For example, the gesture-recognition module can determine the gesture performed by the hand 218 based on captures, by the viewfinder, of the hand 218 during performance of the hand gesture. In some cases, the user can perform the hand gesture while wearing a glove that can help the hand-held device 202 recognize a hand gesture performed by the hand 218. For example, the glove can include reflectors or other recognizable features that can be monitored to recognize the hand gesture.

The hand gesture can be determined to correspond to a hand gesture from a set of recognizable hand gestures. The set of hand gestures can be a predetermined set of hand gestures that can be performed by the user to interact with objects in the AR environment 210. Each hand gesture in the set can correspond to a respective interaction with an object in the AR environment 210. The respective interactions can include a particular type of interaction, for example, a movement interaction to change the location or orientation of the object or a sizing interaction to change the size of the object. In aspects, the respective interactions can specify a direction or amount of the interaction. For example, a single hand gesture can be associated with a movement interaction that moves the location of the object in a particular direction (e.g., left, right, up, down, forward, back, or the like) by a particular amount (e.g., one millimeter, one centimeter, one meter). Similarly, another hand gesture can be associated with a movement direction that changes the orientation of the object in a particular direction (e.g., clockwise, counterclockwise) by a particular amount (e.g., 0.1 degrees, 1 degree, 5 degrees, 10 degrees). Moreover, a different hand gesture can be associated with a sizing interaction that increases/decreases the size of the object by a particular amount (e.g., offered sizes of the object).

In some cases, different gestures can be used to move the object by a different amount. For example, a first hand gesture can move the object in a first direction by a first amount, and a second hand gesture can move the object in the same direction but by a different amount. In some implementations, multiple gestures can be used to communicate the different details about the interaction (e.g., interaction type, interaction direction, interaction amount). For example, the user can perform a first hand gesture associated with a first interaction to specify the type of interaction that is to be performed, a second hand gesture associated with a second interaction to specify the direction of the interaction, and a third gesture associated with a third interaction to specify the amount of the interaction. As a specific example, the user can perform a waving gesture associated with a movement interaction. The user can then perform a pointing gesture (e.g., pointing left) to indicate that the object is to be moved left. Finally, the user can perform a numeric gesture (e.g., holding up two fingers) to indicate that the object should be moved by two units of measure. Alternatively, a single gesture can be associated with multiple details about the interaction. For example, the user can perform a pushing gesture from the right side to the left side of the physical environment 204, and the object can be moved to the left based on the pushing gesture.

The AR environment 210 can include multiple objects that can be interacted with. In some cases, the user can perform a gesture to select a particular object within AR environment 210 on which the interaction is to be performed. For example, the user can perform a hand gesture to select the AR table 212, the AR plant 214, or the AR couch 216 and perform an additional hand gesture to specify a particular interaction to be performed on the selected object. In this way, the hand gesture can be used to interact with a particular object in the AR environment 210. In some cases, any object in the AR environment 210 can be interacted with. For example, the hand gesture can be used to interact with a virtual object created by the AR engine (e.g., AR couch 216) or a rendered object from the physical environment 204 (e.g., AR table 212 or AR plant 214). As such, hand gestures can be used to manipulate AR-created objects or alter the virtualization of the physical environment 204.

The set of recognizable gestures can be a standardized set of gestures such that similar gestures cause similar interactions with AR objects. In this way, an AR engine can natively provide hand-movement based interaction capabilities. In aspects, the standardized set of gestures and the associated interactions can be determined from a library of standardized hand gestures and interactions that are used to provide hand-movement based interaction with AR objects on multiple devices or multiple applications. For example, an application associated with a furniture provider can provide an AR environment to enable customers to visualize a product within their living space, an application associated with an industrial parts supplier can provide an AR environment to enable customers to determine if a part is compatible with another part, and a hand gesture can cause similar interaction with objects in each application. Moreover, different devices can respond to a hand gesture similarly to cause similar interaction with objects in respective AR environments provided by the different devices (e.g., even across device manufacturers).

An interaction can be associated with a hand gesture that mimics the way in which a user would perform that interaction with an object in the physical environment 204. For example, if a user wanted to move a couch to the left in the physical environment 204, the user may use their hand to push the couch. Thus, to provide intuitive gesture-control, a pushing hand gesture can be associated with an interaction to move the object in the direction of the pushing gesture, a pointing gesture or grabbing gesture can be associated with an interaction to select a particular object in the AR environment 210, and a hand-opening/closing gesture can be associated with an interaction to increase/decrease the size of the object. In aspects, the set of hand gestures includes one or more of: a thumbs-up gesture, a thumbs-down gesture, a pointing gesture, a hand-opening gesture, a hand-closing gesture, a pushing gesture, a pulling gesture, a twisting gesture, a pinching gesture, a gesture to hold up a certain number of fingers, or any other gesture.

Figure 3:
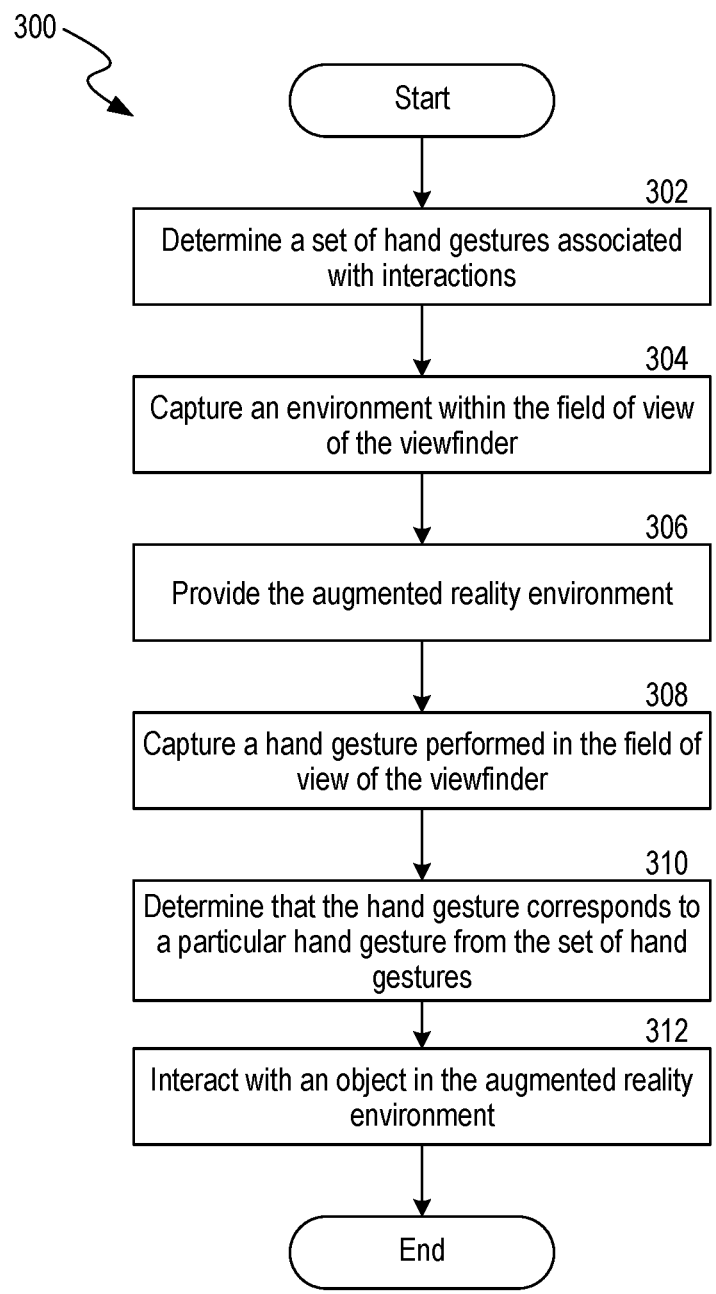
FIG. 3 is a flow diagram that illustrates a method for hand-movement based interaction for AR objects in accordance with aspects of the present technology.

FIG. 3 is a flow diagram 300 that illustrates a method for hand-movement based interaction for AR objects in accordance with aspects of the present technology. At 302, a set of hand gestures that are recognizable to facilitate interactions with AR objects is determined. Each hand gesture in the set of hand gestures is associated with a respective interaction with an object in an AR environment. In some cases, the set of recognizable hand gestures can be standardized hand gestures (e.g., from a library) utilized by multiple devices or applications. For example, performing a hand gesture in an AR environment provided by a first device or application can have a similar effect as performing the hand gesture in an AR environment provided by a second device or application. As a result, user-experience can remain consistent across devices or applications, which can improve user-satisfaction and encourage the adoption of hand-movement based interaction. Moreover, the utilization of standardized hand gestures can enable AR engines to natively support hand-movement based interactions with AR objects without additional updates or features needed to recognize different sets of gestures.

At 304, an environment is captured within the field of view of a viewfinder of a device. The device can include a hand-held device (e.g., smartphone) with a back camera and a display. As used herein, a "back camera" can be a camera located behind the smartphone, on the opposite side of a display screen that is configured to display the images captured by the back camera. The environment can be captured using a back camera of the device. In other implementations, the device can include a wearable AR device (e.g., AR goggles, AR glasses, etc.). The environment can include one or more physical objects to be virtually rendered into an AR environment.

At 306, an AR engine can provide the AR environment. Once captured, the environment can be used as a background of the AR environment in which one or more virtual objects are placed after being created by the AR engine. In some implementations, the physical objects in the environment can be placed into the AR environment as virtual renderings of the physical objects. In this way, the virtual renderings of the physical objects can be interacted with similar to the virtual objects created by the AR engine. One or more virtual objects can be created by the AR engine and placed into the AR environment. The AR environment and virtual objects can be created by an AR-enabled application on the device. For example, a parts supplier can have an application that enables a user to determine whether part A sold by the part supplier is compatible with physical part B by virtualizing part A and arranging it next to part B in the AR environment. In aspects, the AR environment can be displayed on a 2D display of the device. In other implementations, the AR environment can be displayed in a 3D space.

At 308, a hand gesture performed in the field of view of the viewfinder is captured. For example, if the environment is captured using a back camera of a hand-held device, the hand gesture can be performed in view of the back camera of the device. The hand gesture can be captured using one or more appropriate sensors, for example, radar, lidar, or image sensors. The hand gesture can indicate an interaction that the user would like performed on one or more objects in the AR environment. In some implementations, multiple hand gestures can be used to communicate the interaction. For example, a first gesture can indicate an object on which to perform the interaction, and a second gesture can indicate details about the interaction. In some cases, multiple gestures can be used to communicate details about the interaction. For example, a first gesture can communicate a first piece of information about the interaction (e.g., a type of interaction), and a second gesture can communicate a second piece of information about the interaction (e.g., a direction or quantity of the interaction).

At 310, the hand gesture is determined to correspond to a particular hand gesture from the set of hand gestures (e.g., the particular hand gesture is recognized). The AR engine can determine that the hand gesture corresponds to the particular hand gesture based on the hand gesture being sufficiently (e.g., above a recognition threshold) similar to the particular hand gesture. The particular hand gesture can be associated with a particular interaction, and thus, determining that the hand gesture corresponds to the particular hand gesture can cause a particular interaction to be performed on one or more objects in the AR environment.

At 312, the AR engine interacts with an object in the AR environment in accordance with the particular interaction associated with the particular hand gesture. In some cases, the interaction can cause movement or reorientation of the object within the AR environment. In aspects, the hand-movement based interaction can move the object with a finer granularity than enabled by on-device input (e.g., touch input on the display of a hand-held device). In some implementations, the object on which the interaction is performed can be a virtual object created by the AR engine or a virtual rendering of a physical object from the captured environment. In this way, the hand-movement based interaction with AR objects can manipulate the AR environment to suit any number of applications.

Computer System

Figure 4:
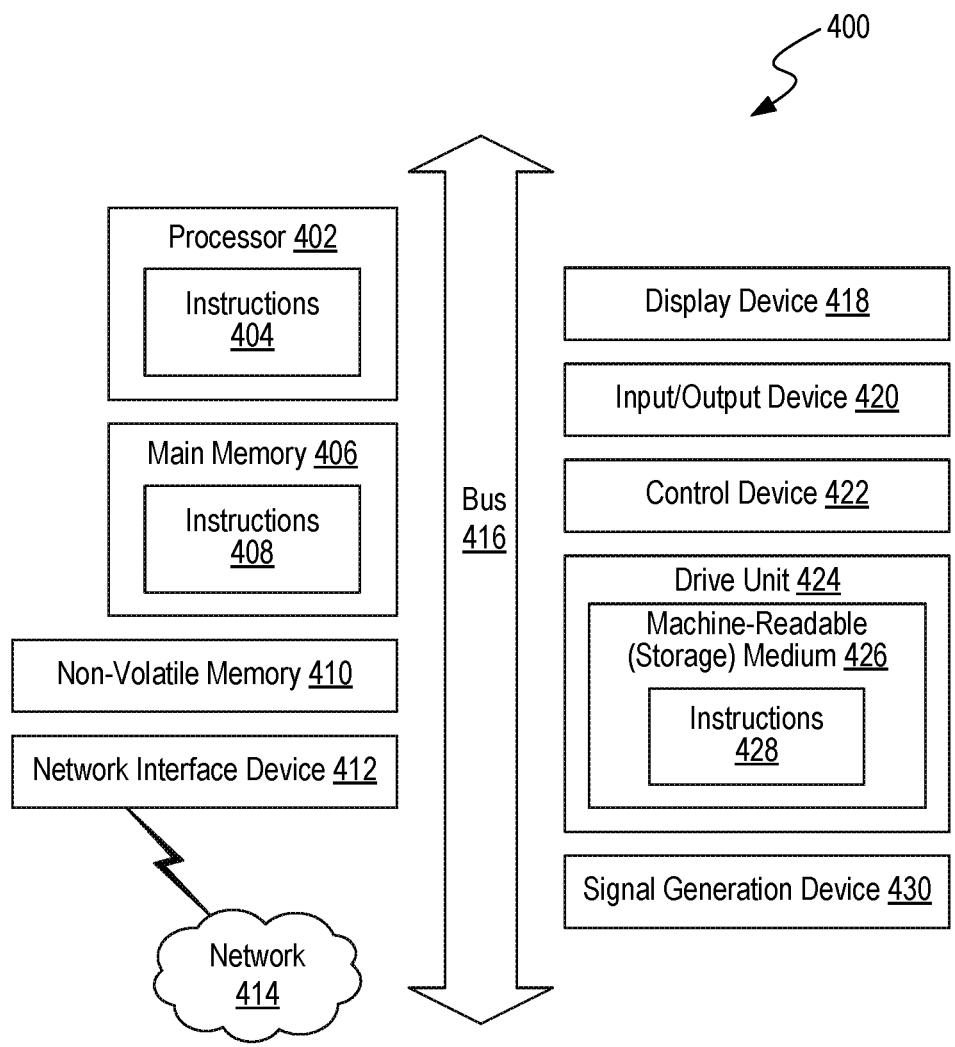
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, a display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementations, the computer system 400 can be an embedded computer system, a system-on-chip (SOC), a single-board computer system (SBC), or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example," "embodiment," and "implementation" are used interchangeably. For example, reference to "one example" or "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described, which can be exhibited by some examples and not by others. Similarly, various requirements are described, which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps or employ systems having blocks in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. At least one non-transitory computer-readable storage medium storing instructions, which, when executed by at least one data processor of a system, causes the system to:
   determine a set of hand gestures associated with interactions with a virtual object in an augmented reality environment,
      wherein each respective hand gesture in the set of hand gestures is associated with a respective interaction with the virtual object in the augmented reality environment;
   capture, using a camera of a smartphone, an environment within the field of view of the camera;
   present the augmented reality environment on the display of the smartphone,
      wherein the augmented reality environment includes the virtual object presented in the captured environment within the field of view of the camera;
   capture a first hand gesture performed in the field of view of the camera,
      wherein the display of the augmented reality environment includes the first hand gesture;
   capture a second hand gesture distinct from the first hand gesture and performed in the field of view of the camera,
      wherein the display of the augmented reality environment includes the second hand gesture;
   determine that the first hand gesture corresponds to a particular hand gesture from the set of hand gestures,
      wherein the particular hand gesture is associated, in the set of hand gestures, with a particular type of interaction with the virtual object in the augmented reality environment, the particular type of interaction comprising a movement interaction to change a location of the virtual object, a rotation interaction to change an angular orientation of the virtual object, or a sizing interaction to change a size of the virtual object;
   determine that the second hand gesture corresponds to an additional particular hand gesture from the set of hand gestures,
      wherein the additional particular hand gesture is associated, in the set of hand gestures, with an amount of interaction with the virtual object in the augmented reality environment,
      wherein the amount of interaction corresponds to a first granularity finer than a second granularity of a touch input system of the smartphone,
      wherein the amount of interaction is independent of a location of a performance of the second hand gesture relative to an arrangement of the augmented reality environment; and
   in response to the determination that the first hand gesture corresponds to the particular hand gesture and the second hand gesture corresponds to the additional particular hand gesture, interact with the virtual object in the augmented reality environment in accordance with a particular interaction, wherein the particular interaction is of the particular type and by the amount.

2. The at least one non-transitory computer-readable storage medium of claim 1, wherein the smartphone includes multiple applications capable of providing augmented reality environments, and wherein the set of hand gestures is associated with the interactions in each of the multiple applications.

3. The at least one non-transitory computer-readable storage medium of claim 1, wherein the system is further caused to:
   capture a third hand gesture performed in the field of view of the camera; and
   select the virtual object from multiple virtual objects in the augmented reality environment based on the third hand gesture,
      wherein the interaction with the virtual object in the augmented reality environment in accordance with the particular interaction is based on the selection of the virtual object from the multiple virtual objects.

4. The at least one non-transitory computer-readable storage medium of claim 1, wherein:
   the smartphone is connected to a telecommunications network; and
   the set of hand gestures is stored on a remote server of the telecommunications network.

5. The at least one non-transitory computer-readable storage medium of claim 1, wherein the particular interaction comprises a movement of the virtual object in the augmented reality environment, and wherein the particular interaction specifies a direction of the movement of the virtual object in the augmented reality environment.

6. The at least one non-transitory computer-readable storage medium of claim 1, wherein:
   the set of hand gestures includes a third hand gesture associated with a first interaction and a fourth hand gesture associated with a second interaction, the fourth hand gesture different from the third hand gesture,
      wherein the first interaction includes a first movement of the virtual object in the augmented reality environment,
      wherein the first interaction specifies a first direction as a direction of the first movement and a first amount as an amount of the first movement,
      wherein the second interaction includes a second movement of the virtual object in the augmented reality environment, and
      wherein the second interaction specifies the first direction as a direction of the second movement and a second amount as an amount of the second movement, the second amount different from the first amount.

7. The at least one non-transitory computer-readable storage medium of claim 1, wherein:
   the set of hand gestures includes a third hand gesture associated with a first interaction and a fourth hand gesture associated with a second interaction, the fourth hand gesture different from the third hand gesture,
      wherein the first interaction includes a first movement of the virtual object in the augmented reality environment,
      wherein the first interaction specifies a first direction as a direction of the first movement,
      wherein the second interaction includes a second movement of the virtual object in the augmented reality environment, and
      wherein the second interaction specifies a second direction as a direction of the second movement, the second direction different from the first direction.

8. The at least one non-transitory computer-readable storage medium of claim 1, wherein the virtual object comprises a virtual rendering of an object from the captured environment.

9. The at least one non-transitory computer-readable storage medium of claim 1, wherein the particular interaction comprises a movement of the virtual object in the augmented reality environment, and wherein the system is further caused to:
  capture the third hand gesture performed in the field of view of the camera,
    wherein the third hand gesture specifies a direction of the movement of the virtual object in the augmented reality environment.

10. The at least one non-transitory computer-readable storage medium of claim 1, wherein:
  the smartphone is connected to a telecommunications network;
  an alternate reality engine used to create the alternate reality environment is stored on a remote server of the telecommunications network; and
  the system is further caused to:
    transmit data indicative of the captured environment to the remote server; and
    receive data indicative of the augmented reality environment from the remote server.

11. At least one non-transitory computer-readable storage medium storing instructions, which, when executed by at least one data processor of a system, causes the system to:
  determine a set of hand gestures associated with interactions with a selected object in an augmented reality environment,
    wherein each respective hand gesture in the set of hand gestures is associated with a respective interaction with the selected object in the augmented reality environment;
  capture, using a viewfinder, an environment within the field of view of the viewfinder;
  provide the augmented reality environment,
    wherein the augmented reality environment includes a plurality of objects comprising a virtual object and a virtual rendering of a physical object from the captured environment within the field of view of the viewfinder,
    wherein the augmented reality environment is controlled through touch inputs at a touch input system on a device on which the augmented reality environment is displayed and hand gesture inputs captured in the viewfinder;
  capture a first hand gesture performed in the field of view of the viewfinder;
  capture a second hand gesture distinct from the first hand gesture and performed in the field of view of the viewfinder;
  determine that the first hand gesture corresponds to a particular hand gesture from the set of hand gestures,
    wherein the particular hand gesture is associated, in the set of hand gestures, with a particular type of interaction with the selected object in the augmented reality environment, the particular type of interaction comprising a movement interaction to change a location of the selected object, a rotation interaction to change an angular orientation of the selected object, or a sizing interaction to change a size of the selected object;
  determine that the second hand gesture corresponds to an additional particular hand gesture from the set of hand gestures,
    wherein the additional particular hand gesture is associated, in the set of hand gestures, with an amount of interaction with the selected object in the augmented reality environment,
    wherein the amount of interaction corresponds to a first granularity finer than a second granularity of the touch input system,
    wherein the amount of interaction is independent of a location of a performance of the second hand gesture relative to an arrangement of the augmented reality environment; and
  in response to the determination that the first hand gesture corresponds to the particular hand gesture and the second hand gesture corresponds to the additional particular hand gesture, interact, in the augmented reality environment, with the virtual object or the virtual rendering of the physical object in accordance with a particular interaction,
    wherein the particular interaction is of the particular type and by the amount.

12. The at least one non-transitory computer-readable storage medium of claim 11, wherein the set of hand gestures associated with the interactions comprises a library of hand gestures, wherein the library of hand gestures is utilized by multiple devices capable of providing augmented reality environments.

13. The at least one non-transitory computer-readable storage medium of claim 11, wherein the set of hand gestures associated with the interactions comprises a library of hand gestures, wherein the library of hand gestures is utilized by multiple applications capable of providing augmented reality environments.

14. The at least one non-transitory computer-readable storage medium of claim 11, wherein the system is further caused to:
  capture a third hand gesture performed in the field of view of the viewfinder; and
  select the virtual object or the virtual rendering of the physical object based on the third hand gesture,
    wherein the interaction in accordance with the particular interaction is performed on the selected one of the virtual object or the virtual rendering of the physical object.

15. The at least one non-transitory computer-readable storage medium of claim 11, wherein the particular interaction is performed on the virtual rendering of the physical object from the captured environment within the field of view of the viewfinder.

16. The at least one non-transitory computer-readable storage medium of claim 11, wherein the particular interaction comprises a movement of the virtual object or the virtual rendering of the physical object in the augmented reality environment, and wherein the particular interaction specifies a direction of the movement of the of the virtual object or the virtual rendering of the physical object in the augmented reality environment.

17. A system comprising:
  at least one hardware processor; and
  at least one non-transitory memory storing instructions, which, when executed by the at least one hardware processor, cause the system to:
    determine a set of hand gestures associated with interactions with a selected object in an augmented reality environment, wherein each respective hand gesture in the set of hand gestures is associated with a respective interaction with the selected object in the augmented reality environment;

capture, using a viewfinder, an environment within the field of view of the viewfinder;

provide the augmented reality environment,
wherein the augmented reality environment includes a plurality of objects comprising a virtual object and a virtual rendering of a physical object from the captured environment within the field of view of the viewfinder,
wherein the augmented reality environment is controlled through touch inputs at a touch input system on a device on which the augmented reality environment is displayed and hand gesture inputs captured in the viewfinder;

capture a first hand gesture performed in the field of view of the viewfinder;

capture a second hand gesture distinct from the first hand gesture and performed in the field of view of the camera;

determine that the first hand gesture corresponds to a particular hand gesture from the set of hand gestures,
wherein the particular hand gesture is associated with a particular type of interaction with the selected object in the augmented reality environment, the particular type of interaction comprising a movement interaction to change a location of the selected object, a rotation interaction to change an angular orientation of the selected object, or a sizing interaction to change a size of the selected object;

determine that the second hand gesture corresponds to an additional particular hand gesture from the set of hand gestures,
wherein the additional particular hand gesture is associated, in the set of hand gestures, with an amount of interaction with the selected object in the augmented reality environment,
wherein the amount of interaction corresponds to a first granularity finer than a second granularity of the touch input system,
wherein the amount of interaction is independent of a location of a performance of the second hand gesture relative to an arrangement of the augmented reality environment; and in response to the determination that the first hand gesture corresponds to the particular hand gesture and the second hand gesture corresponds to the additional particular hand gesture, interact, in the augmented reality environment, with the virtual object or the virtual rendering of the physical object in accordance with a particular interaction,
wherein the particular interaction is of the particular type and by the amount.

18. The system of claim 17, wherein the system is further caused to:
capture a third hand gesture performed in the field of view of the viewfinder; and
select the virtual object or the virtual rendering of the physical object based on the third hand gesture,
wherein the interaction in accordance with the particular interaction is performed on the selected one of the virtual object or the virtual rendering of the physical object.

19. The system of claim 17, wherein the particular interaction is performed on the virtual rendering of the physical object from the captured environment within the field of view of the viewfinder.

20. The system of claim 17, wherein the particular interaction comprises a movement of the virtual object or the virtual rendering of the physical object in the augmented reality environment, and wherein the particular interaction specifies a direction of the movement of the virtual object or the virtual rendering of the physical object in the augmented reality environment.

* * * * *